United States Patent
Wang et al.

(10) Patent No.: US 6,380,959 B1
(45) Date of Patent: Apr. 30, 2002

(54) WEB CALENDAR ARCHITECTURE AND USES THEREOF

(75) Inventors: Shou-Chung Wang, Tenafly; Wenwey Hseush, Montville, both of NJ (US); Anthony Ma, Great Neck, NY (US)

(73) Assignee: Timequarter Computing Corp., Fairfield, NJ (US)

( * ) Notice: Subject to any disclaimer, the term of this patent is extended or adjusted under 35 U.S.C. 154(b) by 0 days.

(21) Appl. No.: 09/269,431

(22) PCT Filed: Sep. 26, 1997

(86) PCT No.: PCT/US97/17389

§ 371 Date: Sep. 27, 1999

§ 102(e) Date: Sep. 27, 1999

(87) PCT Pub. No.: WO98/13753

PCT Pub. Date: Apr. 2, 1998

Related U.S. Application Data

(63) Continuation-in-part of application No. 08/721,446, filed on Sep. 27, 1996.

(51) Int. Cl.[7] .................................................. G06F 7/00
(52) U.S. Cl. ........................................ 345/853; 345/808
(58) Field of Search ................................. 345/331, 335, 345/348, 349, 357, 356, 963, 751, 744, 835, 839, 854, 853, 971, 808

(56) References Cited

U.S. PATENT DOCUMENTS

| | | | |
|---|---|---|---|
| 4,591,840 A | | 5/1986 | Curtis et al. |
| 5,307,086 A | | 4/1994 | Griffin et al. |
| 5,323,314 A | * | 6/1994 | Baber et al. ................. 345/339 |
| 5,428,736 A | | 6/1995 | Kahl et al. |
| 5,572,643 A | * | 11/1996 | Judson ....................... 345/357 |
| 5,706,502 A | | 1/1998 | Foley et al. |
| 5,790,790 A | | 8/1998 | Smith et al. |
| 5,802,530 A | | 9/1998 | Van Hoff |
| 5,812,529 A | | 9/1998 | Czarnik et al. |

FOREIGN PATENT DOCUMENTS

| | | | |
|---|---|---|---|
| EP | 0336868 A2 | 10/1989 | ........... G06F/15/02 |
| EP | 0358301 A2 | 3/1990 | ........... G06F/15/02 |

OTHER PUBLICATIONS

Multimedia Interface Object for Calendar Security and Access Notification, IBM Technical Disclosure Bulletin, Aug. 1993, vol. 36 (08):645–647.

Mapping Calendar Events to Multimedia Display, IBM Technical Disclosure Bulletin, Sep. 1992, vol. 35(4A):468–471.

\* cited by examiner

*Primary Examiner*—Cao H. Nguyen
(74) *Attorney, Agent, or Firm*—Cooper & Dunham LLP

(57) ABSTRACT

An architecture for facilitating Web based Calendar client side event scheduling and, the association process between Java calendar applet ("Capplet") and calendar event. Intent scheduling and calendaring groupware that coordinates group schedules. It features concurrent Capplets running within any of the four calendar grids, namely, monthly, weekly, multiple days and daily.

19 Claims, 5 Drawing Sheets

The joint calendar process allows the viewing and editing of multiple calendars at the same time

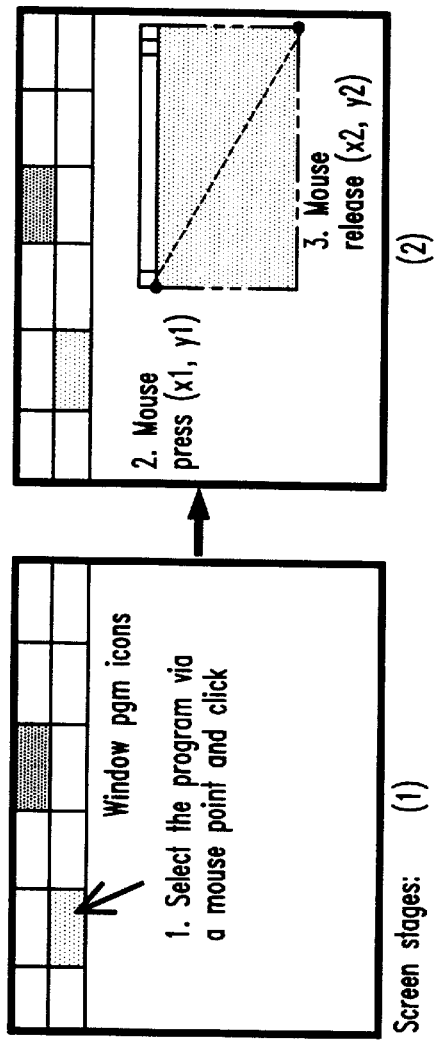
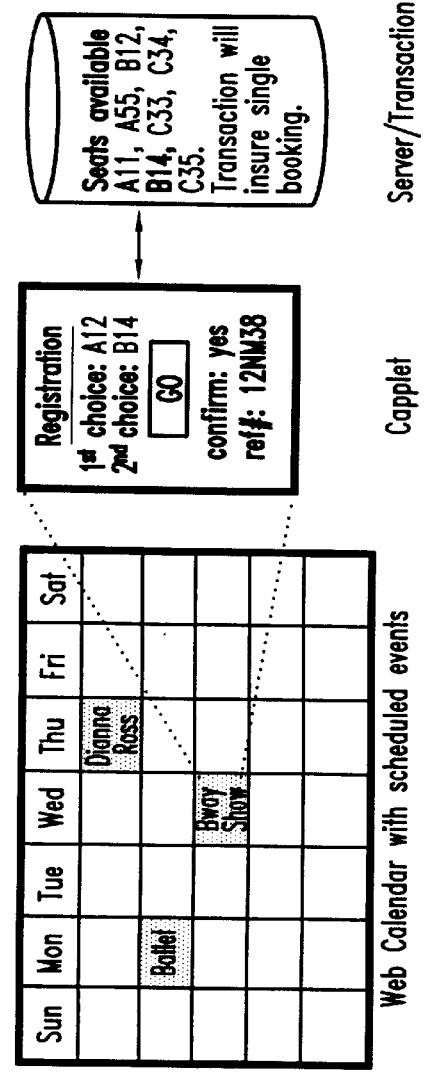
FIG. 7
FIG. 8

WEB CALENDAR ARCHITECTURE AND USES THEREOF

This application is a c-i-p of Ser. No. 08/721,446 filed Sep. 27, 1996.

BACKGROUND OF THE INVENTION

The invention begins with an intention to create a Java visual table widget (vTable) with Internet capability on the Web browser. It can be used by the programmers who need a table widget written in Java to organize data presentation. vTable is a programmable layout manager that supports data presentation in two dimensional grids, rows, columns and cells. vTable adopts model-view GUI paradigm, such that for each view object, there is a model object controlling its contents. There can be multiple views associated with a single model. So once the model's contents changed, all of the related views will be automatically refreshed with the new contents.

When it was completed, we felt a real Internet application that builds upon the visual table would serve to enhance the widget's interfaces and features. The application of Web based Calendar came naturally, since every calendar view uses two dimensional table. Jigsaw puzzle was also in consideration, but was ruled out for it has no practical usage.

The calendar started off as a Web based personal organizer. It provides daily events and appointments scheduling. To make our Web Calendar stands out from the others, we created the calendar-applet ("Capplet") architecture to support the multimedia event contents distribution and online registration. It features client side event specification and the association between Capplet™ and event. To leverage on the Web's interconnection nature, we created group concept which represents a collection of individual canlendars. It allows the sharing and coordinating of events and schedules among a group of users. With the inclusion of group features, the Web calendar has grown from a personal organizer to a scheduling and calendaring groupware.

In addition, as we build the calendar applet, we had enhanced our Java GUI foundation library to support our GUI needs. This includes specialized Layout managers, Panels, List controls and miscellaneous components. Layout manager organize its components geographical locations. Panel is a container that is contained within a container. All of these enhancements are necessary for the Web Calendar GUI and are not provided by the Java language Abstract Windowing Toolkit (AWT).

The scope of the invention covers: 1) Java personal organizer, 2) Internet scheduling and calendar groupware, 3) Calendar event with multimedia effect, 4) Joint multiple calendars view, 5) Open calendar architecture that is ready to run any Java applet, 6) Invocation method for programs with display panels and 7) Internet transaction done directly through calendar events.

The Internet and World Wide Web
Internet

The Internet is the name for a group of worldwide information resources. The roots of the Internet lie in a collection of computer networks that were developed in the 1970s. They started with a network called the Arpanet that was sponsored by the United States Department of Defense. The original Arpanet has long since been expanded and replaced, and today its descendent form the global backbone of what we call the Internet.

It would be a mistake however to think of the Internet as a computer network, or even a group of computer networks connected to one another. The computer networks are simply the medium that carries the huge resource of practical and enjoyable information. The Internet allows millions of people all over the world to communicate and to share. It is a people-oriented society.

Internet has a slew of services: Text file, Telnet session, Gopher, Usenet news group, File Transfer Protocol and the latest and greatest World Wide Web, each with either specialized information contents or specialized network functions.

World Wide Web (WWW)

The Web, one of Internet's many resources, was originally developed in Switzerland, at the CERN research center. The idea was to create a way for the CERN physicists to share their work and to use community information. This idea was soon embraced within the Internet as a general mechanism for accessing information and services.

Like many other Internet resources, the Web uses a client/server system. Users use a client program called a browser act as a window into the Web. From the point of Web, everything in the universe consists of either documents or links. Thus the job of a browser is to read documents and to follow whatever links users select. A browser knows how to access just about every service and resource on the Internet, especially it knows how to connect to WWW servers that offer public hypertext documents.

In the language of the Web, a hypertext document is something that contains data and possibly, links to other documents. What makes the Web so powerful is that a link might go to any type of Internet resource. It is flexible and convenient to use.

The Internet Protocols

The protocols that Internet hosts use to communicate among themselves are key components of the net. For the WWW, HTTP is the most important of these communication protocols. All documents on the WWW are referenced through a URL. And each URL begins with the name of the protocol, HTTP, that is used to find that document. A Web browser must have the HTTP capability built-in.

Java

Java is a language developed by Sun with the intent to meet the challenge of application development in the context of heterogeneous network-wide distributed environments. And the paramount among these challenges is the secure delivery of applications that consume the minimum of system resources, can run on any hardware and software platform, and can be dynamically extended.

The massive growth of the Internet and the World-Wide Web leads us to a completely new way of looking at development and distribution of software. To live in the world of electronic commerce and distribution, the Java language supports secure, high-performance, and highly robust application development on multiple platforms in heterogeneous, distributed networks.

Operating on multiple platforms in heterogeneous networks invalidates the traditional schemes of binary distribution, release, upgrade, patch, and so on. To survive in this jungle, the Java language has to be architectural-neutral, portable, and dynamically adaptable.

To ensure the programmers can flourish within their software development environment, the Java language system that emerged to meet these needs is simple, so it can be easily programmed by most developers, familiar, so that current developers can easily learn the Java language, objected oriented, to fit into distributed client-server applications, multithreaded, for high performance in applications that need to perform multiple concurrent activities, and interpreted, for maximum portability and dynamic capabilities.

Java vs. Procedural Languages

At a fundamental level, procedure languages are designed first to provide programmers with a framework for issuing commands for the computer to execute (hence the term "procedural") and second to allow programmers to organize and manipulate data. Depending on the language, how intuitively a procedural language on these two features very quite a bit. For examples, COBOL, FORTRAN and C are all procedural languages, but each has a specialized area and cannot be interchanged.

An object-oriented language like Java is designed first to allow programmers to define the objects that make up the program and data they contain, and second to define the code that makes up the program.

Many programmers are now using C++ or languages like Object Pascal, Perl 5.0, and Objective C. What these languages have in common is that they are hybrid languages, or procedural languages with object-oriented extensions. These languages make it possible for programmers to use objects within their programs, but they allow-and in many cases required-to use procedural code to accomplish certain tasks.

Java vs. Other Object-Oriented Languages

A pure object-oriented language entails all data in the language is represented in the form of objects. In SmallTalk, which is a pure object-oriented language, every aspect of the language is object- or message-based and all data types, simple or complex, are object classes.

Java implements the basic C simple data types, such as integer, characters and floating point numbers, outside the object system, but deals with everything else as objects. And this language design enables Java to avoid many of the performance pitfalls found in a purely object-oriented language. In all other ways, Java is a pure object-oriented language. All program code and data reside within objects and classes.

Applet

An applet is a small Java program that is automatically downloaded from a Web site and run within your Web browser in response to instructions to do so contained within the Web page you are viewing.

Java Enabled Browser

There are three different types of Web browser, ordinary Web browser, Java-capable Web browser and native Java Web browser. Ordinary Web browser is not capable of handling applets. Users of this kind of browser would not get the results produced by the applets.

A Java-capable browser, such as Netscape/Navigator 2.0 and later releases, is a browser that supports Java applets. This kind of browser provides a display area for the applet either in the browser window which displays the Web in the same way that the browser displays images on a page, or in a pop-up window which displays only the applet. The applet can use this display area however it sees fit, using the area to display buttons and other user interface controls or to display graphics and animation.

HotJava, the native Java Web browser, itself was written in Java. Applets running in HotJava can have much more control over the browser's user interface environment, and the browser can be extended to support new media formats and protocols through the use of Java code. There are definite boundaries between the C code in which the Netscape browser was written and the Java code of the applets that the browser runs.

Java and Other Platforms

Although Sun intends to directly support only a select group of platforms, it has taken steps to ensure that Java will eventually be ported to every platform where there is interest to do so. Sun has made the source code to the JDK freely available for non-commercial use. This triggered a number of efforts to port Java to different platforms including Linux, Next, and Amiga, in addition to Window 95, Window NT and Sun's Solaris, Macintosh, HP/UX, IBM/AIX, and SGI/Irix. These effort is much necessary to truly make Java applets transparent to all the operating environments that are connected to the Internet.

Prior Art

SparcWork Calendar Tool

SparcWork Calendar Tool is a calendar schedule keeper developed by Sun. On one hand, it serves as a personal organizer capable of scheduling and reminding users of their appointments. On the other hand, as a groupware, it has the capability of sharing schedule information work group users.

Like every other scheduling software, Calendar Tool is strictly text based. There's no multimedia effect, no joint multiple calendars view, no collaborative features, and it cannot connect to the Internet services such as e-mail and linkage to other Web resources. Above all, like most of the other vendor scheduler/organizer, it functions only within Sun's proprietary operating system.

BRIEF DESCRIPTION OF FIGURES

FIG. 7: A program invocation method with panel dimension specification.

Figure 1:
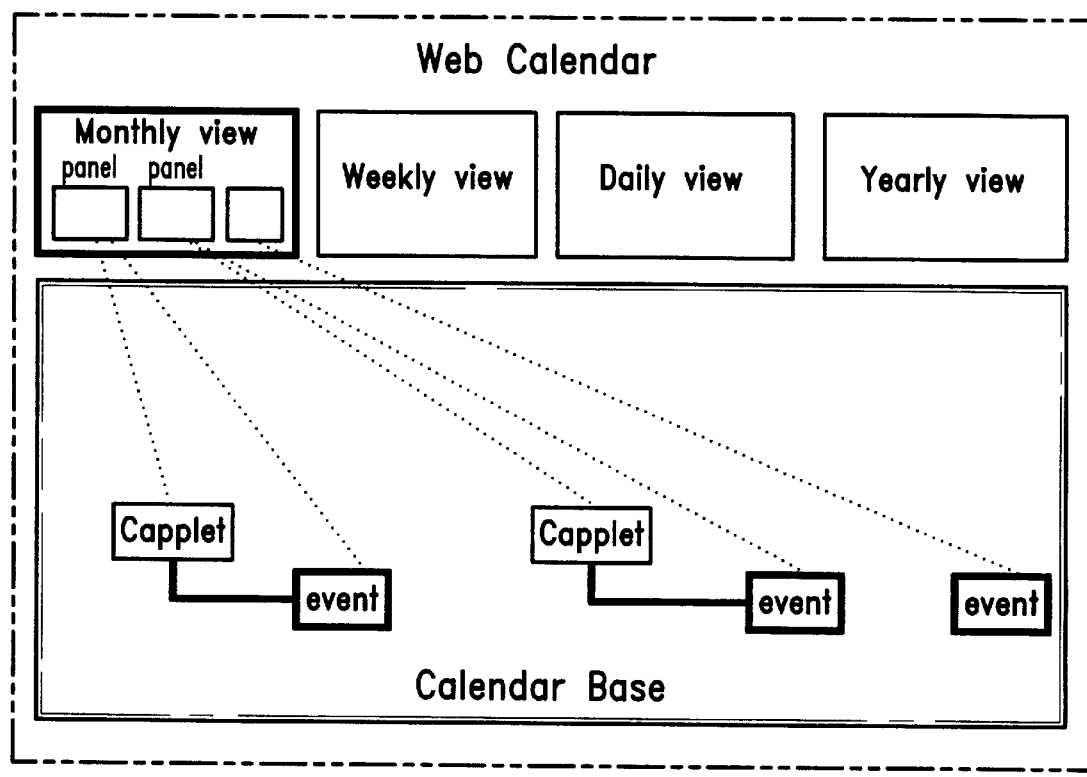
FIG. 1: The Capple™ Architecture.
  This figure illustrates the general Web Calendar architecture that includes a Calendar Base, and all the calendar views that are built upon the base. The Calendar Base supports Capplet™—event association and execution process of Java applet within the calendar environment.

In order to invoke a program in a specific location on screen, and in a panel with specified dimensions, the user can pursue the following steps. First, highlight the program icon with a mouse point and click. Second, select a location on the screen where the running window will fix its left-top corner and, press down the mouse button. Third, drag the mouse diagonal to the desired lower right corner. Fourth, release the mouse button. These steps will trigger the highlighted program and run it in a window with defined left-top and lower-right corners.

FIG. 8: Internet Transaction linked to Calendar event.

While a surfer of Web Calendar checking out the Box Office event schedules, the surfer sees an interesting performance and wants to book a seat. All the surfer needs to do is to bring the mouse pointer to the event text and click the mouse button. This triggers a Registration Capplet™ associated with that performance. By filling out the primary, secondary preference and commit, the surfer instructs the Capplet™ to send the information to the server for a transaction processing. The surfer will then be responded with either a rejection or a confirmation and a reference number by the server. NOTE: Web Calendar has two sides of users; the calendar events publisher (e.g. Museum, Corporations, Sports, College courses, . . . etc.) and the Web surfers (e.g. Consumer, students, . . . etc.).

DETAILED DESCRIPTION OF INVENTION

Terminology Definitions

Web Calendar: a calendar system that runs in a Internet server/browser environment.

Calendar base: the key calendar component that manages scheduled events and controls the execution of actions associated with an event.

Capplet™: a specialized Java program that runs within a Web calendar, to provide multimedia effect or event related transactions for scheduled events. For example, A Capplet™ that sings the happy birthday song while displaying a graphic of animated cake candles and balloons.

A Capplet™ that sings Christmas choir and displays animated snowman or Santa Claus.

A Capplet™ that shows today's weather in a multimedia graphical display.

A Capplet™ that sends an e-mail to the users.

A Capplet™ that schedules future events on behalf of the user.

A Capple™ that is associated with an event or schedule can be forwarded to designated recipients for pleasure or for busines functions.

Calendar view: a view that displays calendar events and their related information with a time perspective. A calendar often has four types of views: monthly, multiple days, weekly, daily and yearly views. Each view has a time scope. For example, a monthly view with a scope of July, 1996 shows events in July, 1996. A weekly view has a scope of seven days. A daily view shows events in 24-hour slots.

Panel: a graphical display area within a view.

Event: an entity associated with a time. An event has at least three components: (1) starting time, (2) ending time and (3) a description. For example, Appointment with dentist at 7:00 pm, Jul. 2, 1996.

John's birthday on Jul. 4, 1996.

Java conference from Jun. 3, 1996 to Jun. 7, 1996.

Dinner appointment at 7:00 pm, Jun. 8, 1996.

Project deadline on Jul. 10, 1996.

HTML (Hypertext Markup Language): It is the language in which the Web documents are written. HTML has the following features:

Document formatting.

The ability to include hyperlinks which point to other Web documents or services on computer systems all over the Internet.

Embed graphical images and clickable image maps with hot spots to take users to various places depending on where in the image users clicked.

Multithreading: The ability to run multiple threads concurrently. Each thread can be thought of as a separate mini-program that gets started by an application and runs in parallel to it. Java program often uses several threads handling various activities such as tracking the mouse position, updating the position of on-screen graphical objects, or simply keeping time.

Object Oriented: A buzzword these days. It is used to describe languages, styles of programming, user interfaces and just about anything else. Conceptually, object programming is often described by example in terms of the real-world objects (cars, people, houses, computers, etc.) by using software objects to simulate them in an object-oriented language.

Protocol: A messaging mechanism that is understood by both ends of the communication line.

Concurrency: Multiple processes or threads running within the same time slot in a time sharing manner. However each process or thread thinks it has the whole CPU to itself. This makes belief that all of the processes are running concurrently.

GUI (Graphical User Interface): A general term for all window based front-end widgets. All GUI's make use of graphics on a bitmapped video display. Graphics provides better utilization of screen real estate, a virtually rich environment for conveying information, and the possibility of WYSWYG (what you see is what you get) video display of graphics and formatted text prepared for a printed document.

Model-View Paradigm: A methodology in GUI programming technique. It entails all displayed data contents be controlled by an independent model object. There is no limit of how many views can be associated with a model. The model has the intelligence of detecting a data content change, and thereby triggering refresh actions for all the related views. Sometimes this intelligence is built in yet a third object called Controller. The ideas is to de-couple display functions and application functions, following a clean and easy to maintain programming practice.

We say that an event occurs if the current time is between the starting time and the ending time of the event.

We say that an event appears in a view if either the starting time or the ending time of the event falls within the scope of the view.

We say that a view is enabled if the calendar user chooses it through user interface.

This invention provides the base Capplet™ architecture recited in FIG. 1, which allows multiple Java programs to run simultaneously in a Web calendar.

Within our Java implemented Web calendar base architecture, Java applet can be associated with any calendar event. Each calendar event, in addition to the applet association, can trigger multiple actions such as e-mail, pop-up alert, beeping. Applets can be triggered simultaneously in the daily, multiple days, weekly and monthly views, either in the cells or in pop-up windows.

Figure 3:
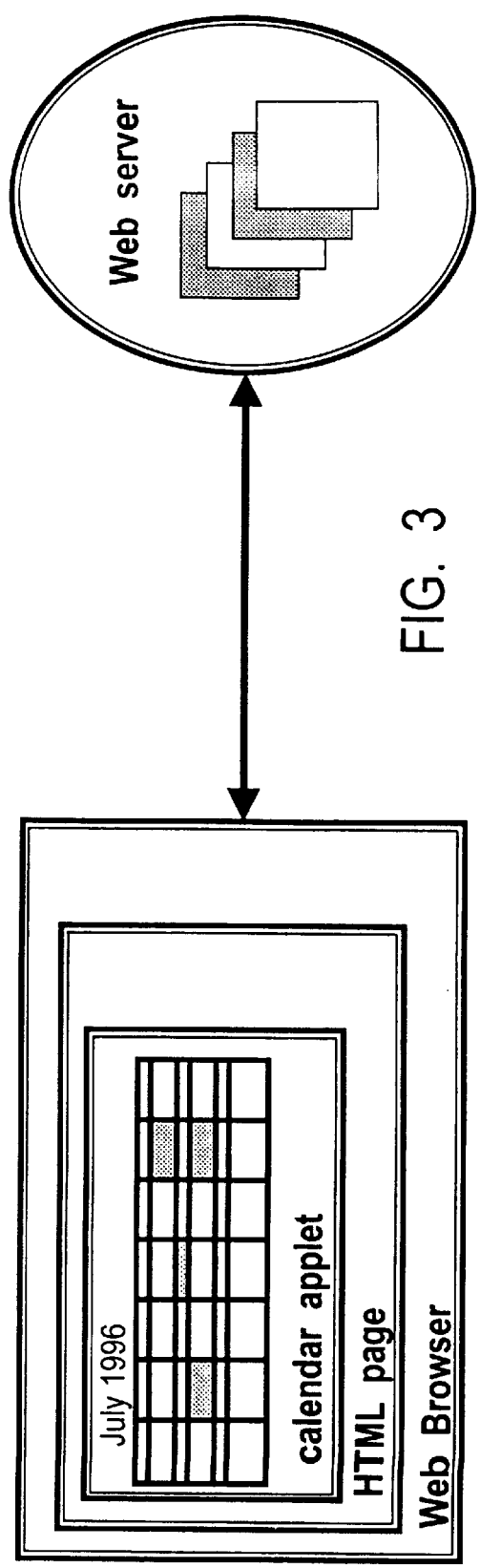
FIG. 3: A Web Calendar implemented as Java applets.
  This figure illustrates a Web Calendar, itself implemented in Java as an applet, that can be included in an HTML document and can be retrieved from any Java enabled Web browser. In contrast to a Web Calendar implemented in HTML, the applet calendar provides distributed process and network load balanced benefits where HTML approach is lacking. The server provides schedule storage and group hierarchy information that feeds the client calendar interactively via the applets.

The Web calendar shown in the basic Capplet™ architecture (FIG. 1) can either be implemented as a Java applet, or as an HTML document that runs within a Web browser (See FIG. 3). In this specification, we describe the implementation of a Java calendar platform applet, which emphasizes on the client side's capabilities and flexibility as opposed to HTML's sole reliance on the server side process.

The Web calendar applet, a platform running either in the Internet or any Intranet environment, organizes and manages event schedules for individuals or working groups. This platform is responsible of keeping and showing the private and/or public event schedules. Events information are displayed in one of the four calendar views (monthly, weekly, daily, multiple days and yearly), and is maintained in the Web server database.

Figure 2:
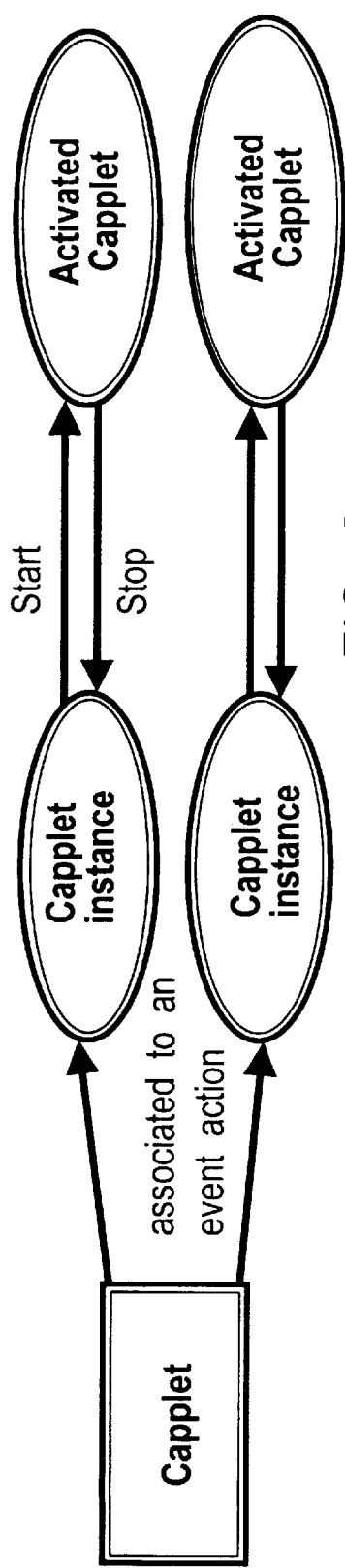
FIG. 2: Stages of Capplet™
  This figure illustrates the stages of Capplet™, from independent applet with a special mission, to an event associated Capplet™ called "Capplet™ instance" and the invoked "Capplet™ instance" within our Web Calendar environment.

A Java program that can run within a Web calendar is named a Capplet™. Once a Capplet™ is associated to an event, it becomes ready to be triggered. The pair [Capplet™, event] is referred to as a Capplet™ instance (See FIG. 2).

Multiple Capplet™ instances may be created with the same Capplet™.

There is no limit regarding the number of Capplet™ instances and the number of Capplets™ that can be associated with an event.

The Capplet™ in a Capplet™ instance may be activated in one of the following five ways:

When the event occurs.

When a user triggers it.

When a view in which the event appears is enabled.

When a second Capplet™ activates it.

When the Capplet™ is associated to an event (i.e., when the Capplet™ instance is created).

An activated Capplet™ can access the information related to its associated event, such as retrieving the event description or inserting a new event into the user's schedule. Multiple Capplets™ can be activated and run in a multi-threaded fashion (simultaneously). One panel in the enabled view may be assigned to a running Capplet™. A Capplet™ can also be a background process without a view.

Association Process

There is an programming interface within the Capplet™ architecture to facilitate Capplet™ and event association. The result object is called a Capplet™ instance. There can be as many Capplet™ instances as the user desires per Capplet™. Each Capplet™ instance carries an event id to maintain its uniqueness within the calendar system. Notice that the Capplet™ instance is persistent, so that user does not have to re-associate the instance, even after it has been activated or even after the whole Web Calendar has been restarted.

Figure 4:
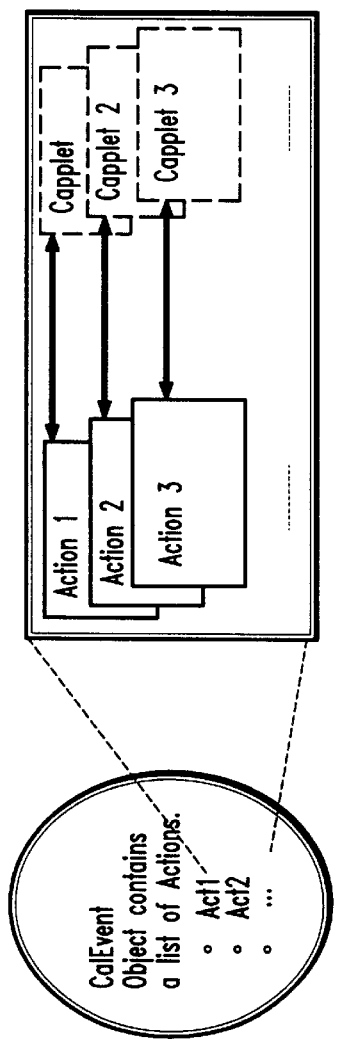
FIG. 4: Calendar Event, Event Action and Capplets™.
  Each scheduled event is defined as a Calendar Event, which in turn contains a list of Actions such as mail alert, beep alert or pop-up alert. In general, Actions describe what the user wants the Calendar to do when the scheduled event arrives. Every event Action has the facility to associate with a specialty Capplet™ and have the Calendar trigger the Action (in turn the Capplet™ automatically or manually.

Within each event, there can be as many actions as the user desires. Each action, carrying an unique action id, can be associated with a Capplet™ shown in FIG. 4. In order to lend the multimedia animation and interaction to otherwise mundane calendar platform, we incorporated a basic Capplet™ architecture into the calendar platform applet. We provided the following five design components:

1. Common Capplet™ interface.

2. The process to associate a Capplet™ to an event.

3. Capplet™ execution environment.

4. Capplet™ triggering mechanisms.

5. Capplet™ plug-in procedure.

Execution Environment

In order to run multiple Capplets™ simultaneously, the calendar applet prepares one environment for each Capplet™ and performs the following:

1. Create a new thread.

2. Execute the init( ) method with the thread.

3. Check whether the Capplet™ has a panel by calling getConfigPanel( ). If yes, add the panel to the view.

4. Execute the start method with the thread.

5. To exit, execute the stop( ) method.

API

```
/*
* Create a schedule item for a certain date.
* @ date-the date when the event is scheduled
* @ detail-the detail of the event
*/
public final class CalEvent extends eRow {
    public CalEvent(String owner, Date date, String
    detail)
    throws IllegalAccessException
    {
    }
    //
    // Modify the privacy setting of this event.
    // The possible values are "U"ser, "G"roup
    // and "W"orld. Only the owner of the event
    // can change the privacy value of the event.
    // Otherwise, an exception will be thrown.
    //
    public setPrivacy(String value) throws
    IllegalAccessException {
    }
    //
    // Check to see if a particular user is the
    // owner of this event.
    //
    public isOwner(String user) {
    }
    public set(String, key, Object value) {
    }
    public Object get(String key) {
    }
    //
    // To determine if a date/time falls within
    // this event's time period. This facilitates
    // the use of multiple days event.
    //
    public boolean inside(WMDate date) {
    }
}
//
// A container class which holds and manages a list
// of action objects associated with a specific
// calendar event-schedule. Each action object in
// the list is associated with an action type.
//
public final class ActionList extends HashTable {
    public Action get(String actionType) {
    }
    public Object put(Object key, Object value) {
    }
}
//
// The Action class is a container class which
// holds information and means to execute
// Capplet ™ or Agent.
//
```

-continued
```
public final class Action extends Object {
    // Create an Action object of a certain
    // action type.
    public Action(String actionType) {
    }
    // Get the type of this action.
    public final String getActionType( ) {
    }
    // The event that is associated with this
    // action.
    public final CalEvent getEvent( ) {
    }
    // Is this an alert type of action?
    public boolean isAlert( ) {
    }
    // Set the time in seconds when this action
    // should take place before the actual start
    // time. The default value is 0. Only an
    // action of ALERT type would be useful in
    // this case.
    public final void setAlertBefore(long seconds) {
    }
    // Set the DOMAIN in which this action should
    // take place. Capplets ™ that are designed to
    // run on CLIENT domain may not suitable for
    // SERVER domain.
    public final void setLocation(int location) {
    }
    public boolean isClientDomain( ) {
    }
    public boolean isServerDomain( ) {
    }
    public void init( ) {
    }
    public void start( ) {
    }
    public void stop( ) {
    }
    public Capplet ™ getCapplet ™ ( ) {
    }
}
```

This invention provides a process to run any Java applet on our Web Calendar. In other words, we claim the open ended characteristics of the overall calendar architecture.

The applet that can be associated with our Web Calendar events and run within our calendar context need not conform to any proprietary application programming interface (API) requirements. Just following the standard Java applet API is enough to be able to associate with our calendar event and run within our calendar.

Figure 5:
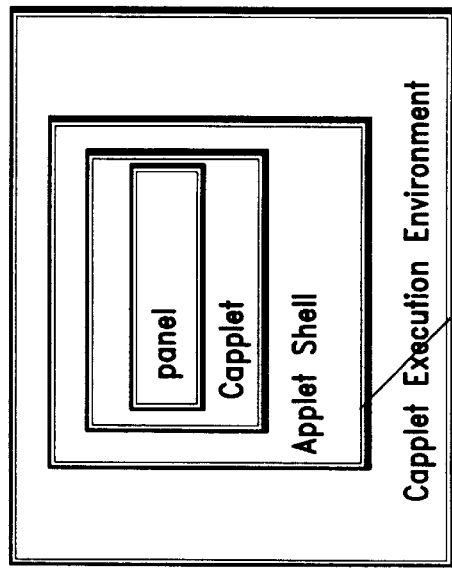
FIG. 5: Applet Running Context.
  This figure illustrates the layers of our approach to facilitate the running of any applet within our Web Calendar. The Applet Shell provides every applet execution conditions needed by the Capplets™. This approach made the Web Calendar an open and extensible platform.

Java applets have its own common interface, which is defined in an abstract class called Applet. In order to run an applet within a Web calendar, the calendar platform applet must provide applet context for each applet. Our approach is to adopt an applet shell, which will serve as an applet context (See FIG. 5).

For each applet to run, there are certain functions that the applet must call to prepare itself before running and coordinate computer resource with other processes while running. Our applet shell that is integrated with the Web Calendar provides these functions so that any applet can run within the Web Calendar views, instead of running in its own applet viewer independently.
API

```
class CappletShell extends Panel implements Capplet ™
{
    Applet applet = null;
    Capplet ™ Shell(Applet applet){
```

-continued
```
        super ( );
        this.applet = applet;
        setLayout (new BorderLayout ( ));
        add("Center", this.applet);
    }
    public void setStub(Appletstub stub) {
        applet.setStub (stub);
    }
    public void initCapplet ™ (CalEvent event, Hashtable param) {
        applet.init( );
    }
    public void start( ) {
        applet.start( );
    }
    public void stop( ) {
        applet.stop( );
    }
}
```

Common Interface

Like Java applet™, every Capplet™ must conform to a common interface. A Java interface is defined as follows:

```
public interface Capplet {
    public void initCapplet ™ (CalEvent event, Hashtable parameters);
    public void start( );
    public void stop( );
}
``` public interface ConfigurableCapplet™ extends Capplet™ {public java.awt.Panel getConfigPanel (java.awt.Frame parentFrame);

public java.util.Hashtable getConfigparameters( );

The object with the interface of Configurable Capplet™ provides a panel and the system will then prepare a applet context for it.

Figure 6:
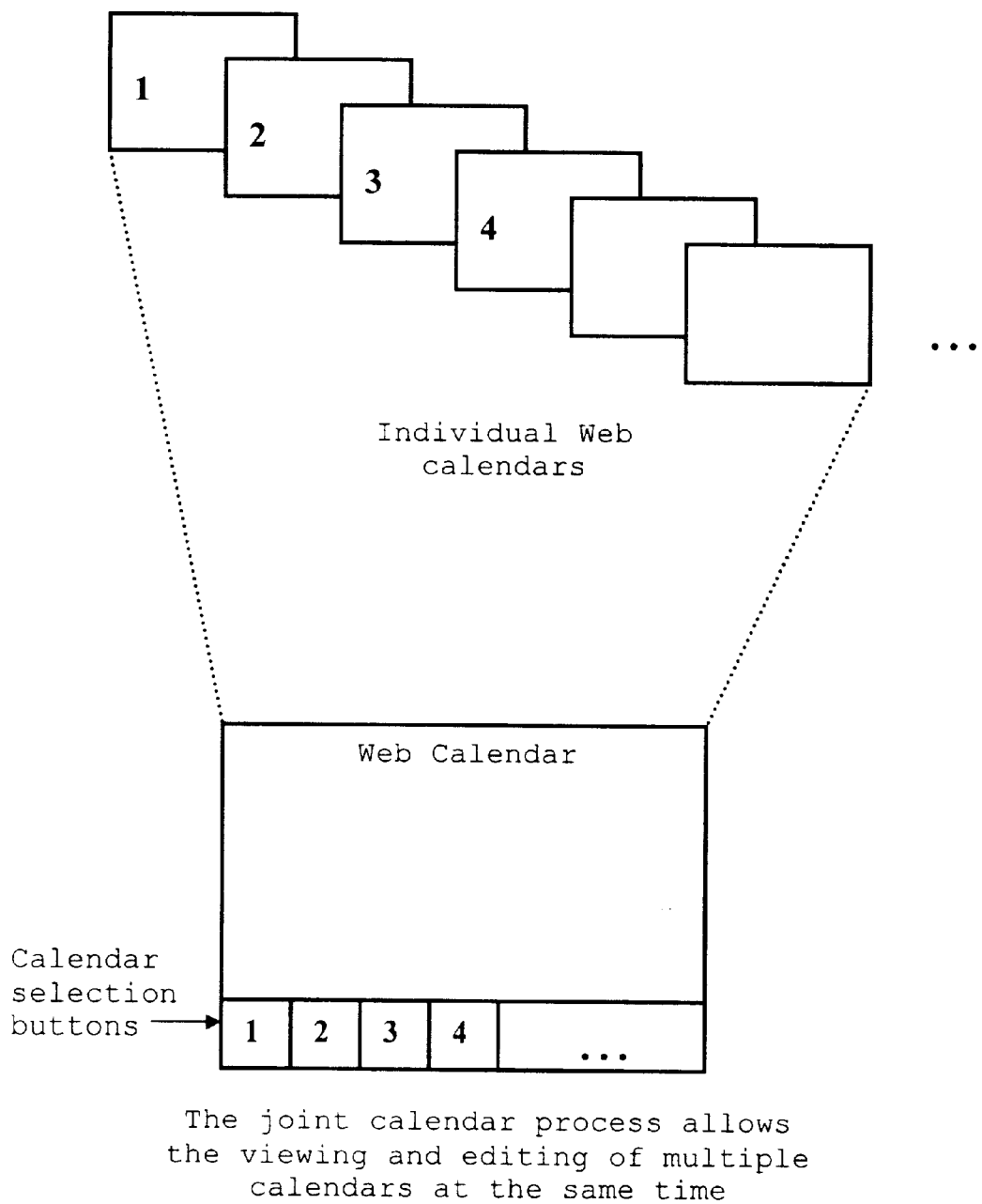
FIG. 6: A consolidated view of multiple Web calendars.
  This figure illustrates our approach to achieve the capability of viewing and editing multiple calendars. Users can view their own calendar along with other calendars within a single calendar view (daily, multiple days, weekly, monthly or yearly). Via the menu push buttons, users have the choice to include/exclude calendars into/from the calendar view, in order to create any desired calendar combinations. This provides users the ability to coordinate schedules among a group of calendars.

This invention provides a process to facilitate the viewing and editing of multiple calendars, using a single calendar view (See FIG. 6). While the users are looking at a single calendar view (daily, multiple days, weekly, monthly, yearly or tasks), the schedule information may consist of one or many Web calendar(s). As the user moves the mouse pointer across the calendar view, the owner information pertinent to the pointed calendar schedule will be displayed at the bottom of the calendar view.

In its embodiment, end-users can choose a collection of calendars to be displayed in a single calendar view. For each calendar selected and downloaded form the Internet/intranet, there is a corresponding menu push button displayed below the calendars. Via these menu buttons, users have the option to dynamically create any calendar combinations from the currently downloaded calendars.

The Web Calendar also provides the editing capability of multiple calendars to specific users. These users are given the authority by the calendar owners to update their calendar schedules, during their absence or inability to update the calendars themselves.
API

```
// Copyright (c) 1995–1998 WebMan Technologies, Inc.
//
// Code segment demonstrating Timecruiser calendar
management.
```

```
//
    // Get all the names of the user selected calendars.
    // Hidden calendars included.
    protected Vector getAllCalNames( ) {
        return (Vector)allCalNames.clone( );
    }
    // Get all the names of the currently visible calendars.
    protected Vector getVisibleCalNames( ) {
        return (Vector)visibleCalNames.clone( );
    }
    // Add a series of calendars to be displayed.
    public void addCalendars(Vector vec) {
        if ( vec == null ) {
            return;
        }
                for ( Enumeration    enum=vec.elements( );
enum.hasMoreElements( ); ) {
            String name = enum.nextElement ( ).toString( );
            addCalendar(name, false);
        }
        lastUpdate new Date ( );
        if ( currentView != null ) {
            currentView.updateView( );
        }
    }
    // Add a single calendar to be displayed.
    public void addCalendar(String name) {
        addCalendar(name, true);
    }
    // Add a calendar to be displayed. If the calendar is
not visible, it
    // will mark to be visible.
    protected void addCalendar(String name, boolean refresh)
{
        if ( !allCalNames.contains(name) ) {
            allCalNames.addElement(name);
        }
        if ( !visibleCalNames.contains(name) ) {
            visibleCalNames.addElement(name);
        }
        lastUpdate = new Date( );
        if ( refresh && currentView != null ) {
            currentView.updateView ( );
        }
    }
    // Remove a series of calendars from memory.
    public boolean removeCalendars(Vector vec) {
        if ( vec == null ) {
            return false;
        }
        Vector bkupVec = new Vector( );
        for ( Enumeration enum=vec.elements( )
            enum.hasMoreElements( ); ) {
            String name = enum.nextElement( ).toString( );
            if ( !removeCalendar(name,false) ) {
                addCalendars(bkupVec);
                errorMsg = "Failed to remove "+name+".
                    Remove command rolled back.";
                calendar.showStatus(errorMsg);
                return false;
            }
            bkupVec.addElement(name);
        }
        lastUpdate = new Date( );
        if ( currentView != null ) {
            currentView.updateView( );
        }
        return true;
    }
    // Remove a single calendar.
    public boolean removeCalendar(String name) {
        return removeCalendar(name, true);
    }
    // Remove a single calendar from the cache.
    protected boolean removeCalendar(String name, boolean
refresh) {
        int index = allCalNames.indexOf(name);
        if ( index < 0 ) {
            return false;
```
```
        }
        allCalNames.removeElementAt(index);
        index = visibleCalNames.indexOf(name);
        if ( index >= 0 ) {
            visibleCalNames.removeElementAt(index);
        }
        lastUpdate = new Date( );
        if ( refresh && currentView != null ) {
            currentView.updateView( );
        }
        return true;
    }
    // Mark a calendar as visible and refresh the screen
immediately.
    // If the calendar is not already loaded, it will be
loaded as well.
    public boolean showCalendar(String name) {
        if ( name == null ) {
            return false.;
        }
        if ( allCalNames.contains(name) ) {
            if ( !visibleCalNames.contains(name) {
                visibleCalNames.addElement(name);
                if ( currentView != null ) {
            lastUpdate = new Date( );
                currentView.updateView( );
            }
        }
            return true;
        }
        return false;
    }
// Mark a calendar as hidden. Calendar data will NOT be
unloaded.
    public boolean hideCalendar(String name) {
        if ( name == null ) {
            return false,
        }
        if ( allCalNames.contains(name) ) {
            int index;
            if ( (index=visibleCalNames.indexOf(name) ) >= 0 ) {
                visibleCalNames.removeElementAt(index);
                if ( currentView != null ) {
            lastUpdate = new Date( );
                currentView.updateView( );
            }
        }
            return true;
        }
        return false;
}
```

This invention provides a process of user interaction to activate a program and run it in a panel whose dimension and location on the screen is dynamically specified. The process includes three steps of user interaction:

1. Select the window/panel based program by focusing on the icon and press the mouse button;
2. Move the mouse to coordinate (x1, y1) and press the mouse button; and
3. Drag the mouse to coordinate (x2, y2) and release the mouse button.

In its embodiment, the program is running within a display panel. In a further embodiment, the display panel is a window based program.

Our process to invoke an applet™ and let the user specify the dimensions and location on screen includes three steps of user interaction.

1. Select the Java program by focusing on the icon and press the mouse button.
2. Move the mouse to coordinate (x1, y1) and press the mouse button.
3. Drag the mouse to coordinate (x2, y2) and release the mouse button.

This is a specific user interaction sequence to invoke our Capplets™ or any Java applet (See FIG. 7). To define the dimension and location for a previously selected Java program, user first chooses an upper left anchor corner of the applet viewer (x1, y1) by a mouse button press, followed by the mouse drag to the lower right corner (x2, y2).

Upon the user's release of the mouse button, a graphical panel with upper left corner of (x1, y1) and lower right corner of (x2, y2) is created and simultaneously the Java program is started within the newly created panel. The Java program can be an applet, a Capplet™ or simply a Java application.

This invention provides a process to produce multimedia effects on a Web Calendar. We have achieved the effect of multimedia calendar events using Java language to implement the Web Calendar.

Separating from the conventional text based calendar event notification, our Web Calendar achieved the multimedia and animated graphic event expression capability. It is possible now to express a calendar event in animated graphics, video with audio effects.

The multimedia effect process is to facilitate Mulitimedia Java applets to be able run in the context of a Web calendar. A Java applet, by definition, is run under a Java enabled Web browser context (referred to as an applet context) and can be programmed to produce multimedia effects. In embodiment, we use Java to implement a Web Calendar that, in turn, provides all the Capplets™ with Java enabled Web browser context.

Our process provides the full applet context in which multimedia capability is included, in a calendar environment (Refer to FIG. 1, 3, 5, 8). This is accomplished by proliferating the applet running context for each cell within the calendar. Each cell on a common calendar monthly, weekly, multiple days or daily grid is capable of running its own Capplet™ instance with multimedia effects, concurrently with other cell's or pop-up window's Capplet™ instances.

See examples of multimedia calendar events cited in the Terminology Definition under Capplet™.

This invention provides a process that integrates transaction capability to scheduled events within Web Calendar. The process provides transaction over Internet, specifically via a Web Calendar event.

The process is to associate Capplet™ that specializes in Internet transaction with Web Calendar event (See FIG. 8). It provides users with the capability to make registrations or reservations for a scheduled event, directly in the Web Calendar. It accomplishes a sensible solution for users to make commitment to calendar events while surfing the net. This is a special embodiment of our Capplet™ and the architecture is recited in FIG. 1. For example, during the query of Lincoln Center opera calendars, the user can actually activate a Capplet™ that handles the seating arrangement and book tickets for the desired shows and, receive either rejection or confirm on the request.

The Capplet™ invoked at client sites handles loading the pertinent registration form for the desired event, collecting the user preference information, sends the information to the server and receive server response for the user.

The server side process of the Web Calendar event transaction is responsible of receiving the registration Capplet™ messages, locking up resources (seats, tickets, classes) and making sure there's only one booking per resource. After completing the request, server process will send back a message indicating the status of the request.

API:
```
/**
    The RegiServer provides a Registration service whereby
    clients can request registration forms from a Form
    database, fill them out and the server will process
    the form and make a reservation.
*/
public class RegiServer implements Runnable {
    protected ServerSocket sock;
    public FormDB rdb;
    public RegiServer( ) {
        try {
            sock = new ServerSocket(port);
        }
        catch (IOException e) {
        System.out.println("Error Creating
                Socket .. exiting");
            System.exit(1);
        }
        // opens the form database
        rdb = new FormDB("FormTable");
        try {
            rdb.open( );
        }
        catch (Exception e) {
            System.out.println("Unable to open
        database")
        }
        run( );
    }
/**
    All server actions are performed here. It waits for
    connections parses client requests and issues
    appropriate calls to the database
* @see RegiDB
* @see ClientComm
*/
    public void run( ) {
    }
/**
* Clean-Up : close the Form database
*/
    public void finalize( ) {
        rdb.close( );
    }
    // This starts the registration server
    public static void main(String argv[ ]) {
    }
/**
* This handles the communication on the server side
*/
class ServerComm extends Thread {
public ServerComm(Socket sock, FormDB formDb) {
        this.start( );
}
public void run( ) {
}
/**
* Registration client capplet ™
*/
public class RegiClient extends Applet ™ implements
        ConfigurableCapplet ™ {
    public RegiClient( ) {
    }
    public RegiClient(FormID formId) {
    }
    /**
    This function is required by the Capplet ™ interface
    *    @param event This is the event associated with
            the capplet ™
    *    @param table: Contains name-value pairs
            containing the parameters
    *    for the registration
    */
    public void initCapplet ™ (CalEvent event,
        Hashtable table) {
    this.eventId = (String)event.getIndexKey( );
    this.eventDesc =
        (String)event.get(EventKey.EVENT_NOTE);
```

```
        init( );
    }
    public void init( ) {
        String formName = getParameter("FORMNAME");
        String formOwner = getParameter("FORMOWNER");
        formId = new FormID(formOwner, formName);
        form = RegiConfig.getForm(formId);
        form.setEvent(eventId, eventDesc);
        setLayout(new BorderLayout( ));
        add("Center", form);
    }
    public void start( ) {
    }
    public void stop ( ) {
    }
    /**
     * Returns registration form configuration
     *     * panel to calendar
     */
    public Panel getConfigPanel(Frame frame,
        CalEvent ev) {
        config = new RegiConfig(user, frame);
        return config;
    }
    /**
     * Returns configuration parameters to
     * calendar
     */
    public Hashtable getConfigParameters( ) {
    }
    class RegiConfig extends Panel {
    /**
     * Constructs config panel
     */
    RegiConfig(String user, Frame frame) {
            this.frame = frame;
            Panel topPnl = new Panel( );
            previewBtn = new Button("Preview . . .");
            topPnl.setLayout(new
            FlowLayout(FlowLayout.LEFT));
            topPnl.add(new Label("Please select a
            registration form:          "));
            topPnl.add(previewBtn);
            constructFormList(user);
            setLayout(new BorderLayout( ));
            add("North", topPnl);
            add("Center", formList);
    }
    /**
     * Constructs form name list for selection
     */
    void constructFormList(String user) {
        formIds = getFormIDs(user);
        formList = new List( );
        for (int i = 0; i < formIds.length; i++) {
            if (formIds[i] != null) {
                System.out.println(formIds[i].getDescription( ));
                formList.addItem(formIds[i].getDescription( ));
            }
        }
    }
    /*
    * Gets names of all forms available to user
    */
FormID[ ] getFormIDs(String user) {
    ClientComm comm = new
        ClientComm(Session.getHost( ),
    Session.getPort( ));
        return comm.getFormList(user);
}
/**
 * Gets registration form (object) by name
 */
static RegiForm getForm(FormID id) {
    ClientComm comm = new
    ClientComm(Session.getHost( ),
    Session.getPort( ));
        RegiForm    form = null;
        return form;
    }
    /**
     * Handles preview button
     */
    public boolean action(Event evt, Object arg) {
        if (evt.target == previewBtn)
                preview( );
        return true;
        }
    } // end of class
    class RegiPreview extends Dialog {
        RegiPreview(Frame frame, RegiForm form) {
            // modal dialog
            super(frame, "Form Preview", true);
            Panel btnPnl = new Panel( );
            btnPnl.setLayout (new
            FlowLayoutFlowLayout.CENTER));
            btnPnl.add(new Button("OK"));
            add("Center", form);
            add("South", btnPnl);
            pack( );
        }
        public boolean action(Event evt, Object arg) {
        if ("OK" equals (arg))
                dispose( );
        return true;
            }
}
/**
 * This handles the communication on the client
 * side
 */
public class ClientComm {
// The protocol for the URLConnection
// NOTE: This will need to be changed to https
            // for secure services
    public static final String protocolDefault = "http";
        public ClientComm(String host, int port) {
        }
        public ClientComm(String protocol,String host, int
    port) {
        }
    /**
     * Saves the form to the form database. The
     * end of the form contents are delimited by
     *     * "endForm" on a new line.
     * @param id: The identifier of the form which
     * is to be saved to the
     * database.
     * @param formContents: The content of the
     * Form as a String
     * @return true if the form is saved
     * successfully, false if the server was
     * unable to save the form or if there was a
     * communication error between server and
     *     * client
     * @see FormID
     * @see RegiForm
     */
    // It will be used by the Form database
    // administrator
    protected boolean saveForm(FormID id, String
        formContents) {
            String key = id.toString( );
            String mesg =
                    "COMMAND=PUT&ARG="
                    +URLEncoder.encode(key+
                    delimiter+formContents+"\nendForm\n")
        try }
            URL target = new
            URL (protocol,host,port,cgi_script+
            "?"+mesg)
                URLConnection conn =
            target.openConnection( );
                conn.setDoInput(true);
                DataInputStream in = new
                DataInputStream(conn.getInputStream( ));
            String line = in.readLine( );
            // find the start of the response
```

```
                        boolean start = false;
                        while (!start) {
/* DEBUG */             System.out.println(line);
                        if (line==null) {
                             System.out.println("Broken
                                  Connection");
                             throw new
        NullPointerException( );
                        }
                        else
                        if(line.equals(startDelimiter)) {
                             start = true;
                        }
                        line = in.readLine( );
                        }
                        // read the response
                        while { !line.equals(endDelimiter)) {
                             if (line.equalsIgnoreCase("true")) {
                                  return true;
                             }
                             else
                        if(line.equalsIgnoreCase("false")) {
                                  return false;
                             }
                        }
                        return false;
                   }
                   catch (Exception e) {
                        return false;
                   }
              }
}
/**
 *     Gets the id's of all the forms in the form
 *     database which are accessible to the user.
 *     The expected response from the server all them
 *     form id's seperated by
 *     delimiters and the response is bounded by
 *     startDelimiter and endDelimiter
 *     on separate lines<p>
 *     i.e. startResponse\n<p>
 *     id1|id2|id3|.....\n<p>
 *     endResponse\n<p>
 *     @param The user who is requesting the form list
 *     @return The form ids
 */
         public FormID[ ] getFormList(String user) {
              int formCount = 0;
              String mesg =
              "COMMAND=GETALL&ARG="
              +URLEncoder.encode(user+del
              imiter+"\n");
              try {
                   URL target = new
              URL(protocol,host,port,cgi_script+
              "?"+mesg);
                   URLConnection conn =
                        target.openConnection( );
                   conn.setDoInput(true);
                   DataInputStream in = new
              DataInputStream(conn.getInputStream( ));
                   String line;
                   line=in.readLine( );
                   //find the start of the response
                   boolean start = false;
                   while (!start) {
/* DEBUG */        System.out.println(line);
                        if (line==null) {
                             System.out.println("Broken
                                  Connection")
                             throw new
                                  NullPointerException( );
                        }
                        else
                        if(line.equals(startDelimiter)) {
                             start = true;
                        }
                        line = in.readLine( );
                        }
                   StringBuffer content = new
                   StringBuffer( );
                   // read the response
                   while (true) {
/* DEBUG */             System.out.println(line);
                        if(line == null) {
                             // this should never occur
                             // normally
                             System.out.println("Broken
                                  Connection");
                             throw new
                                  NullPointerException( );
                        }
                        else if(line.equals(endDelimiter)) {
                             break;
                        }
                        else }
                             content.append(line+"\n");
                        }
/* DEBUG */             System.out.println("CC :"+line);
                             line = in.readLine( );
                   }
                   StringTokenizer st = new
                   StringTokenizer (new
                             String(content),
                             RegiRequestHandler.delimiter);
                   int tokens = st.countTokens( );
                   FormID[ ] ret = new FormID[tokens];
                   for (int i=0; i<tokens; i++) {
                        String next = st.nextToken( );
                        System.out.println("CC:
                             next="+next)
                        FormID id = new FormID(next);
                        if(id.getOwner( ) == null ||
              id.getOwner( ).equals("null".) ||
                             id.getOwner( ).equals(user))
                        }
                             ret[formCount] = id;
                             formCount++;
                        }
                   }
                   return ret;
              }
              catch (Exception e) {
                   e.printStackTrace( );
                   return null;
              }
         }
/**
 *     This instructs the RegiServer to process a form
 *     with some name-value pairs<p>
 *     The expected response is multiline bounded by
 *     "startRequest" and
 *     "endRequest" on separate lines.<p>
 *     @param id : The form which is to be processed
 *     @param eventID: The event which caused the
 *          registration
 *     @param attr : A string which contains the
 *          name-value pairs for
 *          filling the form.
 *     @return The result of processing the form
 */
         public String request(FormID id, String eventID,
         String attr) {
              System.cut.println("CC: REQ "+id+"
                        "+eventID+" "+attr);
              String form_id = id.toString( );
              String mesg =
         "COMMAND=REQ&ARG="+URLEncoder.encode
         (form_id+delimiter+eve
         ntID+delimiter+attr+delimiter+"\n");
              try {
                   URL target = new
         URL (protocal,host,port,cgi_script+"?"+mesg);
                   URLConnection conn =
                        target.openConnection( );
                   conn.setDoInput(true);
                   DataInputStream in = new
                   DataInputStream (conn getInputStream ( ));
                        /* Get the single line response from
```

```
                * the server
                String buffer = in.readLine( );
                return buffer;
                */
                // Get a multi=line response from the server
                // bounded by "startResponse" and
                "endResponse" on
                // separate lines
                StringBuffer content = new
                  StringBuffer( );
                String line = in.readLine( );
                boolean start = false;
                while( !start) {
                    if (line==null) {
                        System.out.println("Broken
                              Connection")
                        throw new
                              NullPointerException ( );
                    }
                    else if
                (line.equals(startDelimiter)) {
                        start = true;
                }
                line = in.readLine( );
                System.cut.println("CC: "+line);
                    }
                    while (true) {
                        if (line == null) {
                            System.out.println("Broken
                                    Connection");
                            throw new
                                    NullPointerException( );
                        }
                        else
                        if (line.equals(endDelimiter)) {
                            break;
                        }
                        else {
                            content.append(line+"\n");
                        }
                        line = in.readLine( );
                        System.out.println("CC: "+line);
                    }
                    System.out.println("CC : "+new
                            String(content));
                    return new String(content);
            }
            catch (Exception e) {
                return null;
            }
        }
    }
}
```

What is claimed is:

1. A method of multimedia information interaction with a user on a Web calendar platform, comprising:

providing a Web calendar base to the user, the Web calendar base including a plurality of Web-based programs and displaying a plurality of Web calendar events;

providing an event interface for associating each Web calendar event with a corresponding one or more of the Web-based programs; and providing a multimedia program interface for executing, when one of the Web calendar events is selected by the user through the Web calendar base, the one or more Web-based programs associated with the selected Web calendar event, to provide multimedia content associated with the selected Web calendar event.

2. The method of claim 1, wherein the multimedia content includes animated graphics.

3. The method of claim 1, wherein the multimedia content includes video.

4. The method of claim 1, wherein the multimedia content includes audio effects.

5. The method of claim 1, wherein the multimedia content includes multimedia interaction.

6. The method of claim 1, wherein when two or more of the Web calendar events are selected by the user through the Web calendar base, the respective multimedia content associated with the two or more Web calendar events are simultaneously displayed.

7. The method of claim 1, wherein the one or more Web-based programs associated with the Web calendar event selected by the user provide continuous multimedia effects.

8. The method of claim 1, wherein the Web calendar base includes a plurality of icons corresponding to respective views, and each view is associated with one or more corresponding Web calendar events and is enabled when the corresponding icon is selected.

9. The method of claim 8, wherein the enabled view provides means for interaction with multimedia objects corresponding to the one or more associated Web calendar events.

10. The method of claim 9, wherein a Web-based program associated with the one or more associated Web calendar events is activated when the user selects the multimedia objects corresponding to the one or more associated Web calendar events.

11. The method of claim 8, wherein a Web-based program associated with one or more corresponding Web calendar events is activated when a view associated with the one or more Web calendar events is enabled.

12. The method of claim 1, wherein a Web-based program associated with one or more corresponding Web calendar events is activated when the Web calendar event associated with the Web-based program is triggered.

13. The method of claim 1, wherein when the user selects two or more of the Web calendar events, the respective Web-based programs associated with the two or more Web calendar events run concurrently.

14. The method of claim 13 further comprising:

providing an executive interface for executing the respective Web-based programs associated with the two or more Web calendar events concurrently using multiple threads.

15. The method of claim 1 further comprising:

providing a calendar event modification interface, wherein the calendar event modification interface monitors user input through the Web calendar base, and creates, modifies or deletes selected ones of the Web calendar events according to the user input.

16. A method of multimedia information interaction with a user on a Web calendar platform, comprising:

providing a Web calendar base, the Web calendar base including a plurality of Capplets and displaying a plurality of Web calendar events;

providing a user interface for user selection of selected ones of the Web calendar events in the Web calendar base; and providing a multimedia program interface for executing, when one of the Web calendar events is selected by the user through the Web calendar base, one or more of the Capplets associated with the selected Web calendar event, to provide multimedia interaction associated with the selected Web calendar event.

17. The method of claim 16 further comprising:

providing an instantiation interface for creating, when one of the Web calendar events is selected by the user through the Web calendar base, a Capplet instance corresponding to a Capplet associated with the selected Web calendar event, and associating the Capplet instance with the selected Web calendar event.

18. The method of claim 16 further comprising:

providing a commerce program interface, wherein the Web calendar base interacts with electronic commerce applets through said commerce program interface.

19. An apparatus for multimedia information interaction with a user on a Web calendar platform, comprising:

a Web calendar base including a plurality of Web-based programs and adapted to display a plurality of Web calendar events;

an event interface adapted to associate each Web calendar event with a corresponding one or more of the Web-based programs; and a multimedia program interface, wherein the multimedia program interface, when one of the Web calendar events is selected by the user through the Web calendar base, executes the one or more Web-based programs associated with the selected Web calendar event, to provide multimedia content associated with the selected Web calendar event.

* * * * *

UNITED STATES PATENT AND TRADEMARK OFFICE
CERTIFICATE OF CORRECTION

PATENT NO. : 6,380,959 B1
DATED : April 30, 2002
INVENTOR(S) : Shou-Chung Wang, Wenwey Hseush and Anthony Ma It is certified that error appears in the above-identified patent and that said Letters Patent is hereby corrected as shown below:

<u>Title page,</u>
Item [73], Assignee, "Timequarter Computing Corp." should read -- Timecruiser Computer Corp. --.
Item [57], ABSTRACT,
Line 3, "Intent" should read -- Internet --.

Signed and Sealed this

Fourteenth Day of January, 2003

JAMES E. ROGAN
*Director of the United States Patent and Trademark Office*